(12) United States Patent
Opatrny

(10) Patent No.: US 9,580,050 B2
(45) Date of Patent: Feb. 28, 2017

(54) MULTI-PURPOSE TOOL

(71) Applicant: Robert B. Opatrny, New York, NY (US)

(72) Inventor: Robert B. Opatrny, New York, NY (US)

( * ) Notice: Subject to any disclaimer, the term of this patent is extended or adjusted under 35 U.S.C. 154(b) by 49 days.

(21) Appl. No.: 14/745,064

(22) Filed: Jun. 19, 2015

(65) Prior Publication Data

US 2016/0368463 A1   Dec. 22, 2016

(51) Int. Cl.
| | | |
|---|---|---|
| *A47L 13/12* | (2006.01) | |
| *B60S 3/04* | (2006.01) | |
| *A46B 15/00* | (2006.01) | |
| *A46B 11/00* | (2006.01) | |
| *A47L 13/08* | (2006.01) | |
| *A47L 13/11* | (2006.01) | |
| *A47L 13/26* | (2006.01) | |
| *A47L 1/08* | (2006.01) | |
| *A47L 1/15* | (2006.01) | |

(52) U.S. Cl.
CPC .......... *B60S 3/047* (2013.01); *A46B 11/0017* (2013.01); *A46B 15/0036* (2013.01); *A46B 15/0081* (2013.01); *A47L 1/08* (2013.01); *A47L 1/15* (2013.01); *A47L 13/08* (2013.01); *A47L 13/11* (2013.01); *A47L 13/12* (2013.01); *A47L 13/26* (2013.01); *B60S 3/044* (2013.01)

(58) Field of Classification Search
CPC ............................ A46B 15/0036; A47L 13/12
USPC ...... 401/39, 139, 195; 7/114, 158, 159, 160, 7/170
See application file for complete search history.

(56) References Cited

U.S. PATENT DOCUMENTS

| | | |
|---|---|---|
| 3,968,535 A | 7/1976 | Nichols, Jr. |
| 4,281,433 A | 8/1981 | Sendoykas |
| 6,010,267 A | 1/2000 | Vito |
| 7,470,078 B2 | 12/2008 | Banco et al. |
| D640,432 S | 6/2011 | Jackson |
| 8,375,500 B1 | 2/2013 | Aguirre |

*Primary Examiner* — David Walczak
*Assistant Examiner* — Joshua Wiljanen
(74) *Attorney, Agent, or Firm* — Florek & Endres PLLC

(57) ABSTRACT

A multi-purpose tool for cleaning automobile windshields and windows comprising a telescoping body having a first and a second end, an ice scraper and a snow brush member attached to the telescoping body at the first end, a scrubbing member and a squeegee attached to the body at the second end, a detachable flashlight and a spray unit with a detachable spray bottle removably attached to the telescoping body, wherein the telescoping body extends intermediate the first end and the second end.

18 Claims, 4 Drawing Sheets

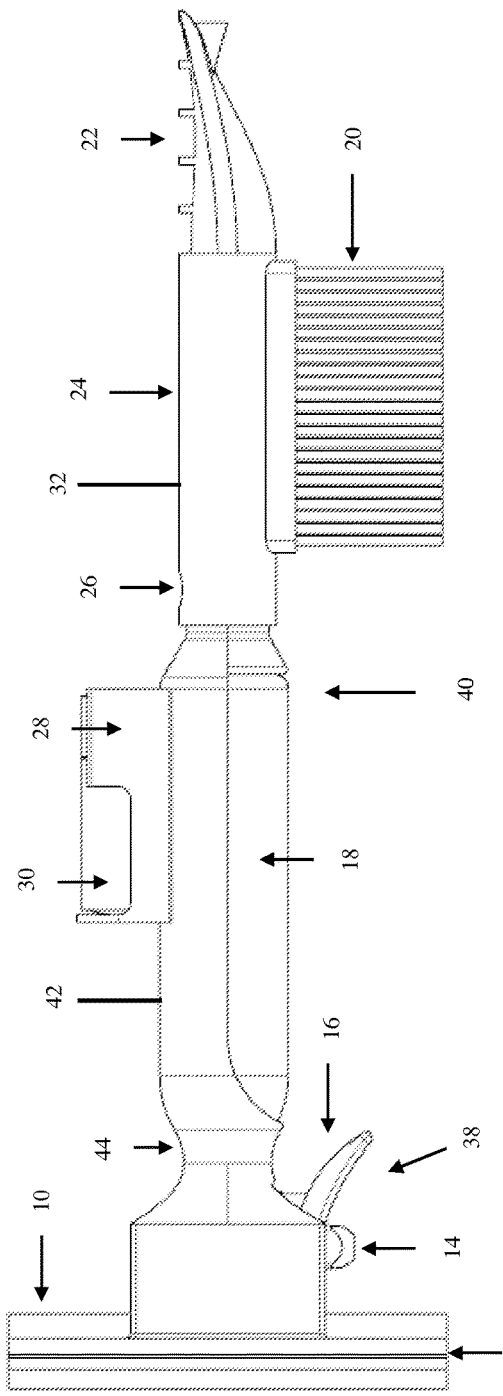
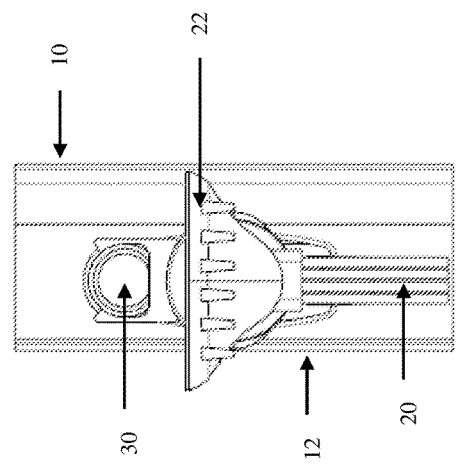
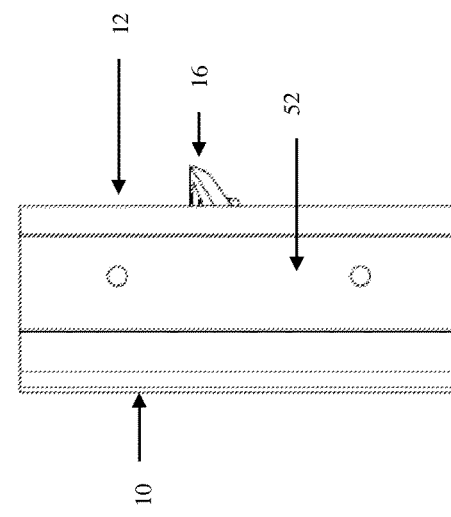

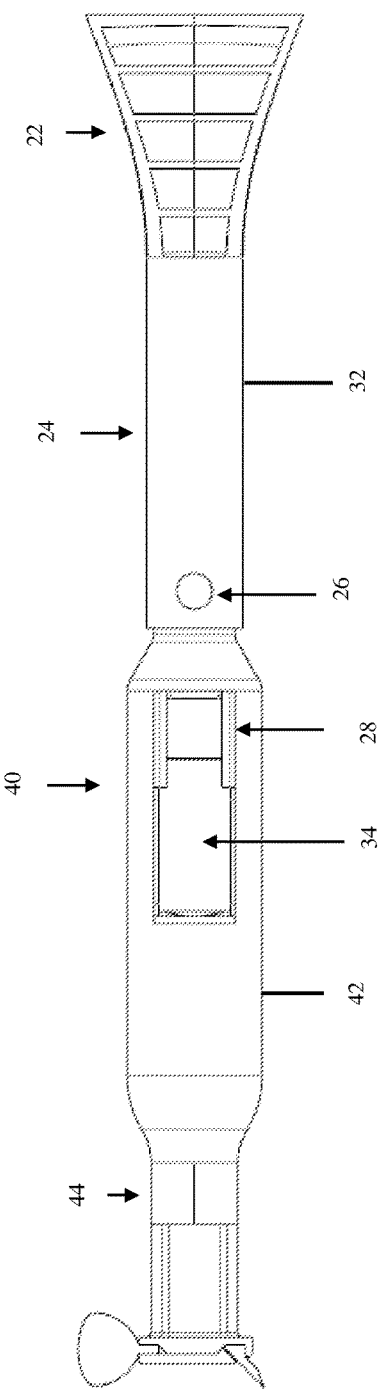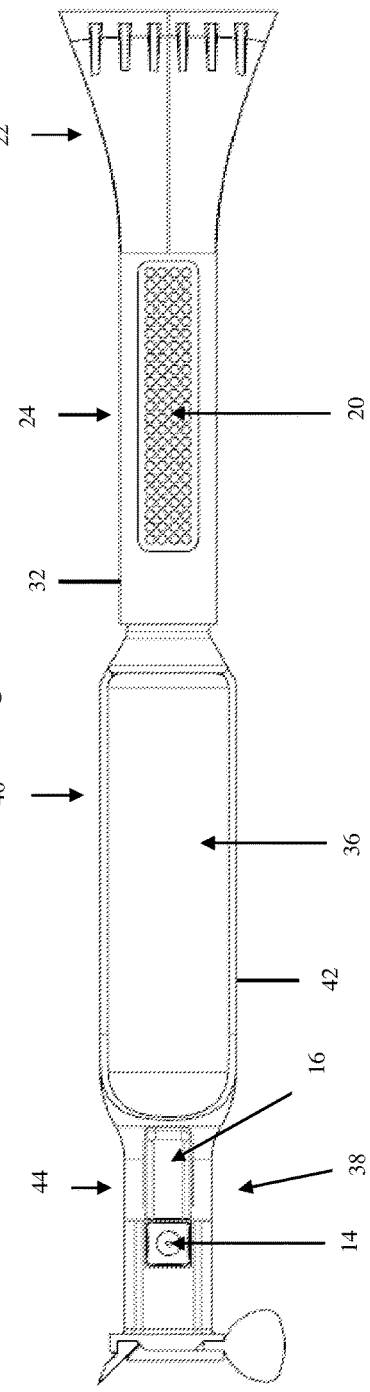

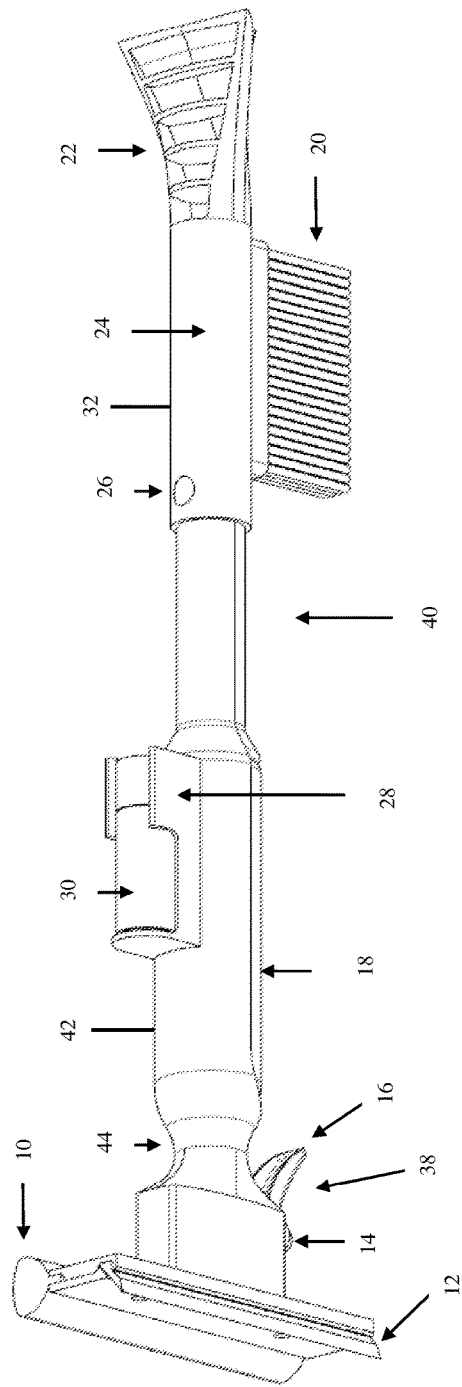
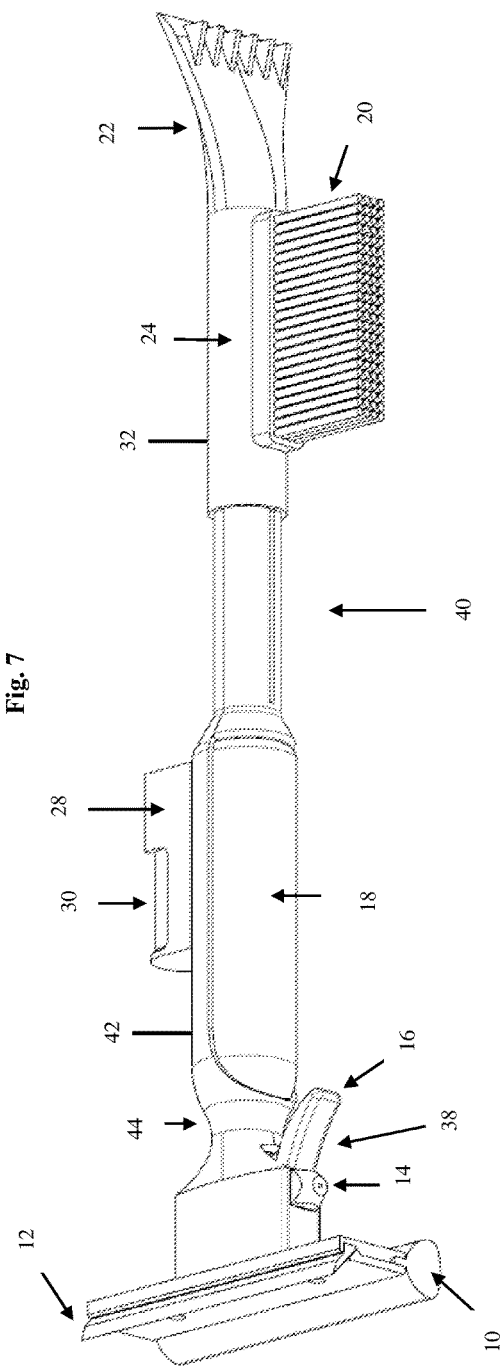
Fig. 6
Fig. 7

MULTI-PURPOSE TOOL

FIELD OF THE INVENTION

The present invention relates generally to a tool for servicing automobiles, and in particular, to a multi-purpose tool particularly adapted for cleaning automobile windshields and windows.

BACKGROUND OF THE INVENTION

Maintaining automobile windshields and windows clean from dirt, ice, snow and other debris is necessary for the safe operation of automobiles. In the winter, it is especially important to clear snow and ice from windshields, windows and other surfaces, such as the hood and the roof of automobiles.

The cleaning of windshields, windows and other surfaces of automobiles is typically a multiple-step process. The most common tools for cleaning automobile windshields and windows of dirt or debris, including insect remains, include a spray bottle of cleaning solution or liquid, a scrubbing apparatus, and a squeegee. One would typically have to gather and use a spray bottle of cleaning liquid to spray the cleaning liquid on an affected surface, a scrubbing apparatus such as a sponge or paper towels to loosen or separate the debris from the affected surface, and a squeegee to remove excess cleaning liquid and debris.

In addition, different tools are necessary for clearing windshields, windows and other surfaces of automobiles from snow and ice. The most common tool available to clear snow and ice from automobile windshields and windows are an ice scraper and a snow brush. Such tools are capable of removing large quantities of snow and ice from windshields, windows and other surfaces of automobiles, as necessary for safe operation. However, such a tool is limited to snow and ice removal and provides very little, if any, utility for finer cleaning of windshields and windows.

Flashlights are among one of the most common items stored in a car and are well known in the art as portable emergency devices. Such flashlights are sometimes equipped with a number of features that include a spot beam, a flood beam, an intermittent flash, or a strobe, and are generally available in different shapes and sizes. However, flashlights are often small and easily misplaced so that they are unavailable when needed.

While these tools fulfill their respective, particular objectives, each suffer from one or more disadvantages. Accordingly, there exists a need for a multi-purpose tool that is particularly adapted for clearing and cleaning automobile windshields and windows from a variety of debris necessary for the safe operation of automobiles. The development of the present invention substantially departs from the conventional solutions and in doing so fulfills this need.

SUMMARY OF THE INVENTION

The multi-purpose tool of this invention comprises a telescoping body having a first and a second end, an ice scraper and a snow brush member attached to the telescoping body at the first end, a scrubbing member and a squeegee attached to the telescoping body at the second end. A capture element for holding a detachable flashlight and a spray unit with a detachable spray bottle are attached to the telescoping body, intermediate the first end and the second end.

This arrangement of the operational components positions the ice scraper and snow brush member on the first end of the telescoping body so that leverage can be used to apply maximum force to clear snow and ice from windshields, windows and other surfaces of automobiles while the scrubbing member and squeegee are unobstructedly positioned so as not to interfere with the use and manipulation of the ice scraper and snow brush member. Likewise, the scrubbing member and squeegee on the second end of telescoping body are disposed in a similar manner so that leverage can be used to clean automobile windshields and windows without obstruction from the ice scraper and snow brush member.

The spray bottle and flashlight are disposed by removable attachment to the telescoping body, attached to the spray bottle receiver and flashlight capture element respectively, so as to remain securely attached during use of the components at the first and second ends. Secure attachment of the spray bottle and flashlight may further provide additional surfaces to grip the invention during use, allowing for greater control of the operational components.

The ice scraper can be made of any suitable durable material that includes, but is not limited to, polyethylene, polyvinyl chloride, polycarbonate, polystyrene or like materials, which can be molded into a suitable shape with suitable edges and supports known in the art to be effective in scraping ice from automobile windshields and windows. The snow brush member can be made of any suitable material including, but not limited to, carbon fiber, nylon, polyester, polyethylene, polyvinyl chloride, polycarbonate, polypropylene, polystyrene, silicone or like materials, which can be fashioned into a plurality of strands or filaments of suitable length and thickness, forming a brush that is effective for removing ice and snow from automobiles.

The scrubbing member can be made of any suitable material such as a natural or synthetic fabric, sponge, cloth, towel, or pad, which is effective for cleaning automobile windshields and windows. The squeegee can be made of any suitable material that includes, but is not limited to, rubber, neoprene, polyurethane or like materials of suitable shape, length and thickness, forming a blade, which is effective for removing liquid from automobiles windshields and windows.

The flashlight can be equipped with any number of illumination features known in the art that include, but are not limited to, a spot beam, a flood beam, an intermittent flash, or a strobe, and with various colors. The flashlight can be of any suitable shape and size that can be removably attached and secured to the telescoping body using a capture element, which may be any means including, but not limited to, fasteners, clamps, clasps, snaps, magnets, clips, flanges, mounts or like means including combinations thereof. The capture element preferably houses the flashlight within a chamber, cage, platform, cavity or the like suitable for receiving at least a portion of the flashlight.

The flashlight is preferably made of suitable materials to provide water resistance and may be powered by any suitable energy source known in the art to provide an electric current, such as batteries, solar cells, hand cranks, etc. The flashlight's features can be activated by one or more suitable switches, such as a push button switch, a slide switch, a turning/twisting switch, a wireless remote or the like, including combinations thereof for the various features.

The spray unit preferably comprises a nozzle, a neck, a spray trigger, a liquid conduit and a spray bottle receptacle as is generally known in the art. The spray unit is preferably configured to be held at the neck and connected to a spray bottle at the spray bottle receptacle to transfer cleaning liquid from a spray bottle and out the nozzle with the activation of a spray trigger. The preferred nozzle can be adjusted to expel liquid in the form of a mist, a squirt, or a spray. When holding the neck, the spray unit preferably provides a suitable grip to access the spray trigger and provides a positive control over activation of the spray.

The spray bottle receptacle can be of any design that is effective to secure the open end of a spray bottle to the spray unit, including screw in, twist in, snap in, clamp in, press fit, or other positive connection elements that provide an air tight seal. The spray bottle can be any container and is preferably a non-breakable material of any suitable shape and size for removable attachment to the telescoping body. In a preferred embodiment, the spray bottle and attached spray unit can be removed as a unit from the telescoping body to spray the cleaning liquid onto interior windows.

The telescoping body can be made of any suitable material that includes, but is not limited to, aluminum, fiberglass, metal, plastic, steel, wood or the like, as well as combinations thereof. The telescoping body preferably extends intermediate the first end and the second end and is formed by a plurality of telescoping sections with one section having an outer diameter which is slightly smaller than an inner diameter of a cooperating section. A diametrically smaller inner portion of one section is slidably received in a diametrically larger outer portion of another section, so that the inner portion may be extended or retracted relative to the outer portion. The telescoping body can extend and retract by any mechanism known in the art. For example, the length of the telescoping body can be adjusted by twisting and locking elements or turning of threaded portions of the connected tubes, spring-loaded catches with a series of cooperating holes, a locking and releasing pin, etc.

The cleaning of encrusted or other hard to remove materials such as dust and dirt, insect remains, and bird excrement from automobile windshields and windows can be accomplished with the application of cleaning liquid from the spray unit, use of the scrubbing member on the affected surface, to loosen and trap debris, and pulling the squeegee across the surface to remove excess cleaning liquid and remaining debris from the affected surface.

For clearing of snow and ice or cleaning a dirty windshield or window, the telescoping body permits adjustment to a desired length for the application of the scrubbing member, squeegee, ice scraper, or snow brush member. The flashlight is capable of providing illumination under inclement weather conditions in areas of poor lighting, to assist in cleaning the automobile windshield and windows as well as for alerting drivers to the presence of a distressed vehicle or a potentially dangerous situation.

A variety of advantages are achieved by various embodiments of the present invention. The functions of a spray unit and spray bottle, scrubbing member, squeegee, ice scraper, snow brush member, and flashlight are all achieved by a single collapsible compact tool, which can be inexpensively manufactured and easily stored as compared to the manufacturing and storage of the individual tools.

The foregoing and other advantages of the invention will become apparent from the following description. In the following description, reference is made to the accompanying drawings which form a part thereof, showing by way of illustration, preferred embodiments of the invention. Such embodiments do not represent the full scope of the invention. Reference should therefore be made to the claims herein for interpreting the scope of the invention.

BRIEF DESCRIPTION OF THE DRAWINGS

FIG. 1 is a front elevation of a multi-purpose tool of the present invention with the telescoping handle collapsed;

FIG. 2 is a top plan view of a multi-purpose tool of the present invention.

FIG. 3 is a bottom plan view of a multi-purpose tool of the present invention.

FIG. 4 is a first side elevation of a multi-purpose tool of the present invention with the telescoping handle collapsed;

FIG. 5 is an second side elevation of a multi-purpose tool of the present invention with the telescoping handle collapsed;

FIG. 6 is a first side perspective view of a multi-purpose tool of the present invention with the telescoping handle extended;

FIG. 7 is a second side perspective view of a multi-purpose tool of the present invention with the telescoping handle extended.

DETAILED DESCRIPTION OF THE PREFERRED EMBODIMENT

Figure 8:
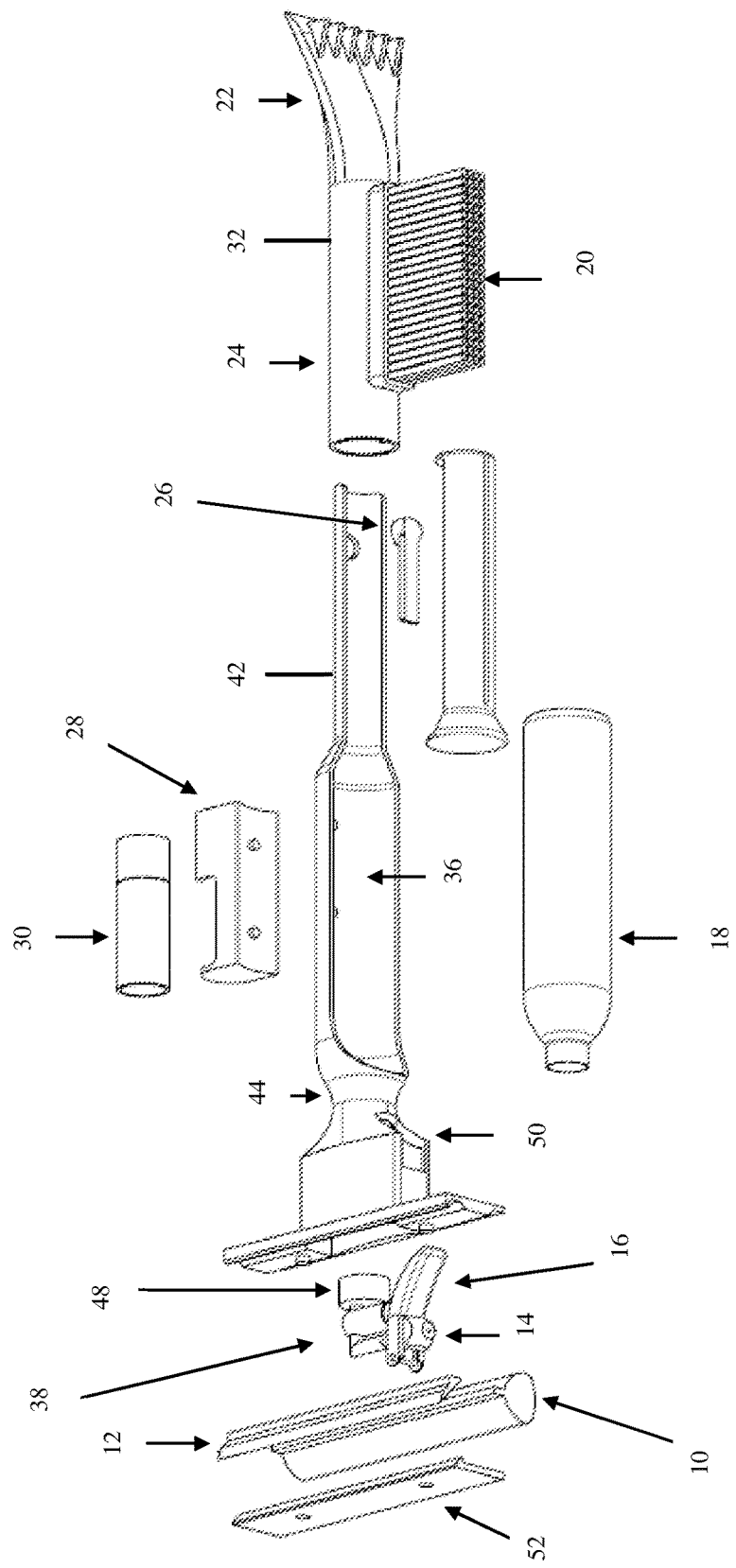
FIG. 8 is an exploded view of a multi-purpose tool of the present invention.

The present invention is now described with reference to the appended figures which indicate identical or functionally similar elements. While specific configurations and arrangements are discussed, it should be understood that this is done for illustrative purposes only. A person skilled in the relevant art will recognize that other configurations and arrangements can be used without departing form the spirit and scope of the invention.

As seen in FIG. 1, the invention comprises a telescoping body 40 having a first and a second end, an ice scraper 22 and a snow brush member 20 attached to a first end of the telescoping body 40, a scrubbing member 10 and a squeegee 12 attached to a second end of the telescoping body 40. A detachable flashlight 30 is removably attached to the telescoping body 40 by capture element 28 and a spray unit 38 having a cooperating detachable spray bottle 18 is removably attached to the body at a receiver 36. The telescoping body 40 preferably also includes a handle portion 24 between the first end and the second end.

As seen in FIG. 8, the telescoping body 40 is preferably formed by two cooperating sections, a first body section 32 and a second body section 42 that cooperate to extend and retract the length of the telescoping body 40. In a preferred embodiment, the capture element 28 for the flashlight 30 and receiver 36 for the spray bottle 18 are located on opposite sides of the one of the cooperating sections 32 or 42 of the telescoping body 40, so as to not interfere with the use and manipulation of the flashlight 30 and spray bottle 18.

In the embodiment illustrated in FIG. 8, the spray unit 38 is incorporated in, and at least partially enclosed by, the receiver 36 forming a portion of the second cooperating section 42 of the telescoping body 40, wherein an external opening 50 is provided for the nozzle 14 and spray trigger 16 of the spray unit 38 to protrude from the body 40. In another preferred embodiment, the spray unit 38 is attached to the spray bottle 18 to form a sprayer capable of removal from and reattachment to the telescoping body 40 as a unit. This allows the user to remove the sprayer from the telescoping body 40 to spray interior windows or the like without having to maneuver the entire multipurpose device in tight spaces.

The first cooperating section 32 and second section 42 of the telescoping body 40 may be made of any suitable material that includes, but is not limited to, aluminum, fiberglass, metal, plastic, steel, wood, etc., or combinations thereof. In a preferred embodiment, the first and second cooperating sections 32 and 42 are cooperating tube sections with a portion of the second cooperating section 42 having an outer diameter which is slightly smaller than an inner diameter of an immediately overlaying portion of the first cooperating section 32. The diametrically smaller inner portion of the second cooperating section 42 is slidably received in diametrically larger outer portion of the first cooperating section 32, so that the inner tube may be extended or retracted relative to the outer tube of the first cooperating section 32.

Although the illustrated embodiment has two telescoping sections, additional telescoping sections can be used to permit a larger telescoping body 40. The telescoping body 40 can extend and retract by any mechanism known in the art. In a certain embodiment, the length of the telescoping body 40 can be adjusted by twisting or turning of threaded portions of cooperating sections 32 and 42. In another embodiment, the cooperating sections 32 and 42 include a twist lock which tightens the locking portion of the outer tube on the inner tube. In a preferred embodiment, as illustrated in FIGS. 4 and 6, the handle portion 24 of the telescoping body 40 has a spring lock button 26 which interlocks the first cooperating section 32 with the second cooperating section 42 at predetermined lengths when the lock button is depressed and the handle portion 24 is slidably extended or retracted as desired.

The ice scraper 22 at the first end of the telescoping body 40 is preferably molded with an extended straight working edge having support ribs on the opposite side so as to be effective in scraping ice from automobile windshields and windows. In a preferred embodiment, as illustrated in FIGS. 1 and 3-8, the ice scraper 22 extends from handle portion 24 of telescoping body 40 in a length and width terminating with a working edge and evenly spaced support ribs protruding from the back for structural rigidity.

The snow brush member 20 at the first end of the telescoping body 40 is comprised of strands or filaments of suitable length and thickness to form a brush which is effective for removing ice and snow from windshields, windows and other surfaces of automobiles. In a preferred embodiment, as illustrated in FIGS. 1 and 5-8, the snow brush member 20 comprises a plurality of strands or filaments extending from telescoping body 40 in an orientation opposite the working edge of the ice scraper 22, so that the snow brush member 20 and ice scraper 22 do not interfere with each other when in use.

The scrubbing member 10 at the second end of the telescoping body 40 has a working edge that is preferably natural or synthetic sponge covered by an open cell abrasive material. In a preferred embodiment, as illustrated in FIGS. 1, 2 and 6-8, scrubbing member 10 is attached to the body 40 by attachment member 52. The attachment member 52 may be any device for holding the scrubbing member 10 to the telescoping body 40, including but not limited to a mounting plate, clamp, clips, screws, tracks, catches or the like, which preferably attaches the scrubbing member 10 and squeegee 12 to the telescoping body 40. The attachment member 52 can be selected to permit removable attachment for replacement of the scrubbing member 10 and/or squeegee 12 or for permanent attachment of the components. In a preferred embodiment, the attachment member 52 is a metal plate attached to the second end of the telescoping body 40 by screws.

The squeegee 12 can be made of any suitable material but is preferably a rubber or neoprene strip of suitable shape, length and thickness to form a working edge comprising a blade that is effective for removing liquid from automobile windshields and windows. In a preferred embodiment, as illustrated in FIGS. 1-3 and 6-8, the squeegee 12 comprises a rubber blade that is attached to the body 40 with attachment member 52. The squeegee 12 is also positioned in a manner so as not to interfere with the use and manipulation of the scrubbing member 10. Most preferably, the scrubbing member 10 and squeegee 12 are oriented opposite each other on the second end of the telescoping body 40, with the working surfaces of the scrubbing member 10 and squeegee 12 oriented perpendicular to the working surfaces of the snow brush member 20 and ice scraper 22. This orientation permits each of the components to be used without interference from the other components.

The detachable flashlight 30 is equipped with any number of illumination features, most preferably including a spot beam, a flood beam, and a strobe and may include different color lights or light shades. The flashlight 30 can be of any of suitable shape and size to be removably attached to the telescoping body 40 by capture element 28 and is preferably removably attached by snap in members. The capture element 28 is preferably formed to include a chamber, cage, platform, cavity or the like that is suitable for receiving and covering at least a portion of the flashlight 30. In a preferred embodiment, as illustrated in FIGS. 1, 4 and 6-8, the flashlight 30 is secured to the telescoping body 40 by capture element 28 comprising snap-in side walls for removable attachment of the flashlight 30 with the application of sufficient inserting or lifting force on the flashlight 30. In another embodiment, not shown, the capture element 28 includes a top catch and a bottom catch with a spring loaded element to securely hold the flashlight 30 within a chamber.

The flashlight 30 is preferably manufactured to provide water resistance, to allow the flashlight to be used in inclement weather. The flashlight 30 also preferably includes a magnet to attach the flashlight to a metal surface for hands-free operation when the flashlight 30 is detached from the telescoping body 40. In a preferred embodiment, the flashlight 30 can be easily removed from the multipurpose tool to illuminate a dark area with a steady beam of light or magnetically attached to a suitable area on an automobile, and set to emit intermittent flashes of light, and preferably a yellow or red light, to alert drivers to the presence of a distressed vehicle or potentially dangerous situations.

The flashlight 30 is preferably powered by commercially available batteries, however it may also be powered by a renewable source, such as a solar cell or hand crank. The flashlight 30 is activated by a suitable switch, such as a push button switch, a slide switch, a turning/twisting switch, a wireless remote or the like, including combinations thereof for the various preferred features.

The spray unit 38, as illustrated in FIGS. 1 and 4-7, is located proximate to the scrubbing member 10 and the squeegee 12 at the second end of the telescoping body 40. The spray unit 38 preferably comprises a nozzle 14, a neck 44, a spray trigger 16, and a spray bottle receptacle 48 for connecting to a detachable spray bottle 18. The spray bottle 18, alone or with the spray unit 38 attached at the receptacle 48 to create a unitary sprayer, is preferably removably attached to the telescoping body 40 at receiver 36.

In a preferred embodiment, as illustrated in FIGS. 5 and 8, the spray bottle 18 is removably attached and detached to the spray unit 38 by screwing and unscrewing the threaded male opening from the spray bottle 18 into the complementary threaded female portion of the receptacle 48. The spray bottle 18 can be easily removed from the spray unit 38 for refilling of the spray bottle 18 as desired. When the spray bottle 18 is attached to the spray unit 38 to form a unitary sprayer removable from the telescoping body 40, the sprayer can be used separate from the telescoping body 40.

The spray bottle 18 can be any container that is suitable to contain a suitable cleaning liquid, such as, water, alcohol, glycol or similar liquids, and is preferably formed of a non-breakable material. The spray bottle 18 can be any suitable shape and size that can be removably attached to the telescoping body 40 at the spray bottle receptacle 48. The spray bottle receiver 36 securely holds the spray bottle 18 on the telescoping body 40, either to engage the spray unit 38 incorporated into the telescoping body 40 or as a unitary sprayer, where the receiver 36 preferably covers at least a portion of the spray bottle 18.

During use, the spray unit 38 is preferably held at the neck 44, with activation of the spray trigger 16 transferring cleaning liquid from the spray bottle 18 through a conduit (not shown) and out of the nozzle 14. In a preferred embodiment, the nozzle 14 is designed with an adjustable head that can be adapted to deliver liquid from the spray bottle 18 in the form of a mist, a squirt, a spray, a stream, or the like. The neck 44 is preferably formed as a tapered section of the telescoping body 40 that is suitable for grasping by a human hand without impeding access to the spray trigger 16.

The spray trigger 16 may be any activation mechanism. In a preferred embodiment, the spray trigger 16 is spring loaded and contains a pumping mechanism whereby activation of the trigger results in moving air in, and forcing cleaning liquid out, of the spray bottle 18 by pneumatic force. However, the spray trigger 16 can also be a push button that activates an electric pump for delivery of the cleaning liquid, if desired.

The spray trigger 16 and spray nozzle 14 are preferably located below and in an orientation parallel to the scrubbing member 10 and the squeegee 12. Such an orientation not only provides a compact design but also to protect the parts of the spray trigger 16 and spray nozzle 14, from damage during storage and use of the tool with the sprayer attached.

While certain exemplary embodiments have been described and shown in the accompanying drawings, it is to be understood that such embodiments are merely illustrative and not restrictive of the current invention, and that this invention is not restricted to the specific constructions and arrangements shown and described since modification can occur to those ordinarily skilled in the art.

Variations, modifications, and alterations to the above detailed description will be apparent to those skilled in the art. All such variations, modifications and/or alternatives are intended to fall within the scope of the present invention.

The term "comprising" as used in the following claims is an open-ended transitional term that is intended to include additional elements not specifically recited in the claims.

It should be noted that it is envisioned that any feature or element that is positively identified in this document may also be specifically excluded as a feature or element of an embodiment of the present invention.

The invention claimed is:

1. A multi-purpose tool, comprising:
a telescoping body having a first and a second end,
an ice scraper and a snow brush member attached to the telescoping body at the first end,
a scrubbing member and a squeegee attached to the telescoping body at the second end,
a flashlight removably attached to the telescoping body; and
a spray unit with a detachable spray bottle attached to the telescoping body,
wherein the telescoping body extends intermediate the first end and the second end.

2. The multi-purpose tool of claim 1, wherein the ice scraper and snow brush member have working edges extending opposite each other at the first end.

3. The multi-purpose tool of claim 2, wherein the working edge of the snow brush member is oriented perpendicular to the working edge of the ice scraper.

4. The multi-purpose tool of claim 1, wherein the scrubbing member and the squeegee have working edges that extend opposite each other at the second end.

5. The multi-purpose tool of claim 1, where each of the snow brush member, ice scraper, scrubbing member and squeegee each have working edges, with the working edges of the snow brush member and ice scraper oriented perpendicular to the working edges of the scrubbing member and squeegee.

6. The multi-purpose tool of claim 1, where the flashlight is removably attached to the telescoping body by a capture element.

7. The multi-purpose tool of claim 6, wherein the capture element covers at least a portion of the flashlight.

8. The multi-purpose tool of claim 1, wherein the flashlight is equipped with a spot beam, a flood beam, an intermittent flash, and a strobe.

9. The multi-purpose tool of claim 1, wherein the flashlight is water resistant.

10. The multi-purpose tool of claim 1, wherein the spray unit further comprises an adjustable nozzle, a neck, a spray trigger, and a spray bottle receptacle for receiving the spray bottle.

11. The multi-purpose tool of claim 10, wherein the spray unit is located at the second end of the telescoping body adjacent to the scrubbing member and squeegee.

12. The multi-purpose tool of claim 11, wherein the nozzle is oriented perpendicular to a working edge of at least one of the scrubbing member and squeegee.

13. The multi-purpose tool of claim 1, wherein the spray unit is incorporated into the telescoping body.

14. The multi-purpose tool of claim 1, further comprising a receiver on the telescoping body for retaining and covering at least a portion of the spray bottle.

15. The multi-purpose tool of claim 1, wherein the telescoping body is formed of a material taken from the group consisting of aluminum, fiberglass, metal, plastic, steel, wood, and combinations thereof.

16. The multi-purpose tool of claim 1, wherein the telescoping body comprises a first cooperating section and a second cooperating section, said first cooperating section having at least one outer dimension which is slightly smaller than at least one inner dimension of a cooperating section of said second cooperating section, so that the dimensionally smaller portion of said first cooperating section is slidably received in at least a portion of said dimensionally larger second cooperating section for extending or retracting the telescoping body.

17. The multi-purpose tool of claim 16, wherein the telescoping body further comprises a lock button which fixes the first cooperating section relative to the second cooperating section at a predetermined length.

18. The multi-purpose tool of claim 16 wherein the spray unit and detachable spray bottle are removably attached to the telescoping body as a unit to permit use as a sprayer apart from the multipurpose tool.

* * * * *